June 26, 1962 J. W. GRATIAN 3,041,415

ELIMINATION OF AMPLITUDE DISTORTION NOISE

Filed Dec. 17, 1958

INVENTOR.
JOSEPH W. GRATIAN

BY W. J. Shanley Jr.

ATTORNEY

United States Patent Office 3,041,415

Patented June 26, 1962

3,041,415

ELIMINATION OF AMPLITUDE DISTORTION NOISE

Joseph Warren Gratian, Rochester, N.Y., assignor to General Dynamics Corporation, Rochester, N.Y., a corporation of Delaware Filed Dec. 17, 1958, Ser. No. 781,150

14 Claims. (Cl. 179—100.2)

Figure 1:
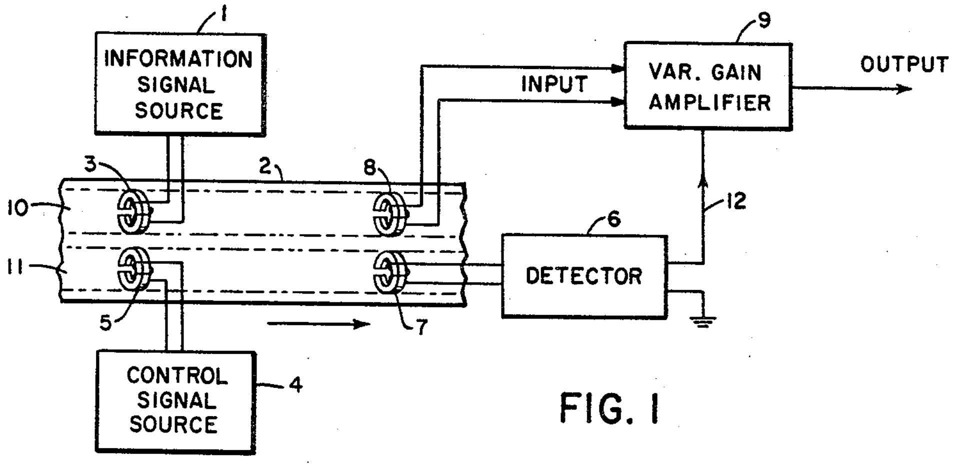

This invention relates to magnetic recording, and more particularly to a magnetic recording system which utilizes a control signal recorded upon the magnetic medium to control the playback level of an information signal which is recorded upon the same magnetic medium.

This system is particularly useful for automatically compensating for variations in the uniformity of the magnetic properties of a recording medium. The lack of uniformity of the properties of the magnetic medium is evidenced by the introduction of amplitude distortion in the playback signal when compared with the signal as originally recorded. Since amplitude distortion cannot be tolerated in recording systems used for instrumentation applications, these variations in uniformity of the recording medium become a serious problem.

In the past, various types of systems have been designed to minimize this problem. One of the most common type systems is an FM system which is extremely complex and requires very stable oscillators and discriminators in order to maintain the required amplitude accuracy. Since these FM systems require a carrier, much higher tape speeds are therefore necessary in order to accommodate this carrier with the resulting increase in the amount of tape necessary. Other systems have also been proposed wherein the signal to be recorded is varied in magnitude prior to its being recorded upon the tape in order that the playback signal will not contain variations in amplitude which are attributable to these nonuniformities of magnetic properties. However, it is noted that these systems are also quite complex and their synchronization is quite critical since the precompensated signal must be recorded on the exact area of the magnetic recording medium for which it was precompensated in order that the recorded signal when read out will be an accurate representation of the original signal.

It is, accordingly, an object of this invention to provide an improved magnetic recording system.

It is another object of this invention to provide a magnetic recording system which utilizes a recording medium having a recorded control signal thereon which control signal when detected is used to control the playback characteristics of an information signal which is also recorded upon the magnetic recording medium.

It is a further object of this invention to provide a magnetic recording system which automatically compensates for variations in the magnetic properties of the recording medium upon playback of the information signals upon the medium.

In general, I accomplish these and other objects of this invention by providing a control signal on a track parallel to the signal information track so that when it is desired to read out the signal information, the control signal is detected and the variations therein due to variations in the magnetic properties are accordingly sensed and utilized to control the amplification of the playback signal to thereby compensate for these variations.

The foregoing and other objects and advantages of this invention will become apparent as the following description proceeds, and the features of novelty which characterize this invention will be pointed out with particularity in the claims annexed to and forming a part of this specification.

Figure 2:
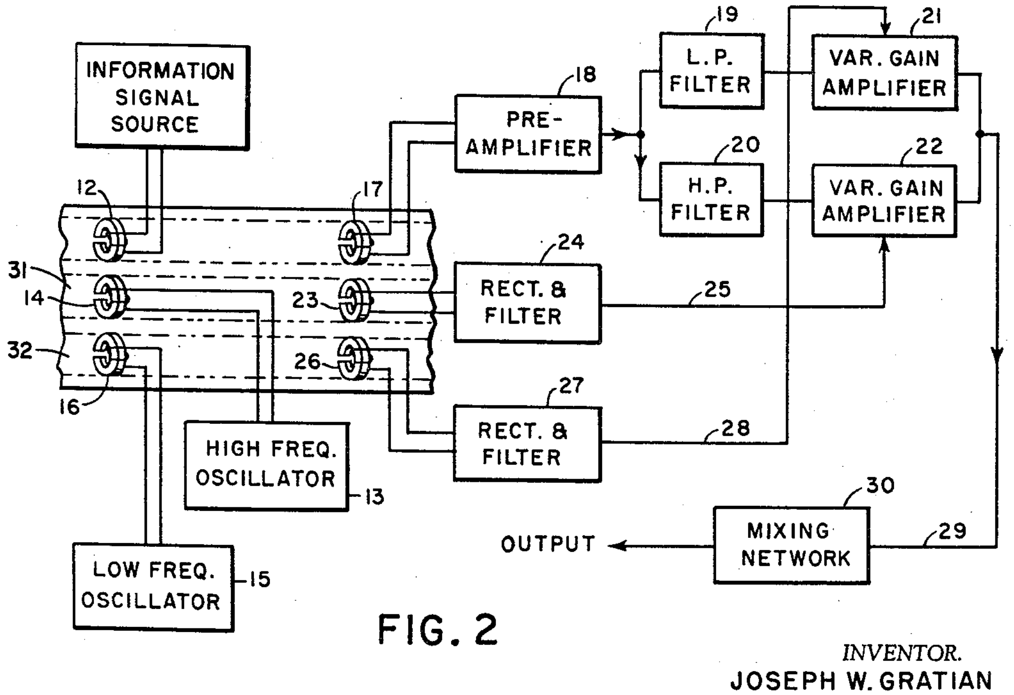

For a better understanding of this invention, reference may be had to the accompanying drawings in which:

FIG. 1 is a diagrammatic representation of a magnetic recording system embodying this invention; and, FIG. 2 is a diagrammatic representation of an embodiment of this invention which is utilized for broadband applications.

Referring now to the drawings, and particularly FIG. 1, magnetic recording medium 2 is shown passing in proximity to record heads 3 and 5 and read heads 7 and 8. Information signal source 1 is connected to record head 3 to thereby record the information signal upon signal information track 10 of recording medium 2. Control signal source 4 is connected to record head 5 to thereby impress the control signal upon control signal track 11 of recording medium 2. Read head 8 is positioned to sense the information signal recorded upon track 10 when recording medium 2 is driven past the read head. Read head 8 is connected to the input of variable gain amplifier 9. Read head 7 which is positioned in transverse alignment with read head 8 is positioned to overlie control signal track 11 to thereby detect the recorded control signal of track 11. In one embodiment of the system of FIG. 1, control signal source 4 will be an oscillator generating a constant amplitude A.C. signal which will be recorded upon control signal track 11 by record head 5. Thereafter, this control signal will be read from control signal track 11 by read head 7 and applied to detector 6 which will detect the control signal and generate a D.C. signal for controlling the gain of amplifier 9 over conductor 12.

When control signal source 4 comprises an oscillator generating a constant amplitude control signal, detector 6 will correspondingly include a rectifier and filter network for generating a D.C. control signal which is proportional to the magnitude of the A.C. control signal read out by read head 7. The amplitude of this read out control signal will vary in accordance with the variations of the magnetic properties of recording medium 2 in control signal track 11. I have discovered that the pattern of variation of the magnetic properties in one track of a recording medium, that is, for example, control signal track 11, will correspond quite accurately with the pattern of variation of an adjacent track. Thus, in accordance with this invention, I simultaneously sense the uniformity pattern of the control signal track and generate a control signal of such a polarity as to automatically modify the output level of the information signal being simultaneously read out from the adjacent track. Thus, in accordance with this invention, the variations in magnetic properties of the recording medium are compensated for upon reading out the recorded signal. Thus there is no necessity that the part of the system of FIG. 1 containing the signal sources and record heads be located a the same location as the read out portion of the system. However, for representational purposes, it was convenient to make it appear as if these operations were carried on at the same place and at the same time. It will be recognized, however, that the recording operation can occur independently of the readout operation which can take place at any time thereafter. Furthermore, it is contemplated that the recording part of the operation can be performed by a conventional magnetic recording system by utilizing a magnetic recording medium having the control signal prerecorded upon the track adjacent to the track upon which the signal information is to be recorded. In this way, through the use of prerecorded tapes, the recording operation could be carried out by conventional magnetic recording systems and thereafter upon reading out the recorded signal information, the compensation can take place in accordance with applicant's invention by the read out portion of the system.

Since the uniformity problem becomes progressively worse as the signal wavelength to be recorded is decreased, the control signal frequency generated by the oscillator should be near the high frequency end of the spectrum of signals to be recorded thereon. However, this frequency should not necessarily be the highest frequency of the spectrum since this could cause excessive variations in the amplifier gain even through the low frequency distortions due to these variations were not significant. Thus, if the control signal frequency were selected at the highest frequency of the spectrum of the information signals, excessive compensation would be introduced at the low frequency end of the information signal spectrum. Thus the selection of the control signal frequency would depend upon the width of the signal information frequency spectrum as well as the high frequency and low frequency uniformity characteristics of the magnetic recording medium.

It is further contemplated that it might be desirable to utilize a D.C. control signal of constant amplitude rather than an A.C. control signal. If D.C. control signals were preferred it would only be necessary to substitute a D.C. source for the oscillator, as the control signal source. In such a situation, read head 7 and detector 6 would then be replaced by a flux responsive type of magnetic recording head which is responsive to magnetic recorded signals of extremely low frequencies or even D.C. recorded magnetic signals. For example, detector 6 and read head 7 could be replaced by the flux responsive pickup disclosed in FIGS. 1–3 of Gratian et al., 2,725,430, issued November 29, 1955. The read out head disclosed therein utilizes a two-gap magnetic core wherein an electron beam pickup tube is arranged concentric with the pickup head. The flux induced in the pickup core is applied across the back gap of the pickup structure to thereby control the position of the electron beam relative to the pickup plates at the end of the cathode ray tube device. This device produces a push-pull output but obviously it can also provide the required single-ended output necessary to control variable gain amplifier 9. The output signal selected should be of the correct phase to increase the bias on the amplifier when the magnitude of the control signal increases and vice versa. For a more complete description of the operation of the electron beam pickup, reference may be had to the Gratian et al. Patent 2,725,430. However, it suffices to say that such a flux responsive pickup or, for that matter, any other of the well known type of flux responsive pickup head can be used to sense the D.C. control signal and provide a D.C. output proportional to the magnitude of the control signal as read from the control signal track.

Referring now to FIG. 2, the system disclosed therein illustrates a magnetic recording system operating according to the principles of this invention, which is particularly adapted for broadband applications. Since the uniformity of the magnetic properties of a recording medium is a function of frequency, it is desirable in broadband applications to divide the information signal into two frequency bands after reading out the information signal. These two bands are then independently amplified with the gain of each amplifier controlled in accordance with two separate control signals.

The first control signal is generated by high frequency oscillator 13 and is recorded upon the high frequency control signal track 31 by record head 14. The second control signal is generated by low frequency oscillator 15 and is recorded upon low frequency control signal track 32 by record head 16. The high frequency control signal is preferably recorded upon the track nearest the signal information track since the high frequency signals are more susceptible to the distortion caused by the nonuniformity of the magnetic properties. By locating the high frequency track next to the signal information track, a more accurate control signal will be generated for the high frequency information due to the physical proximity of the two tracks which result in a better correlation between the patterns of nonuniformity of the two tracks.

The information signal previously recorded is read out by read head 17 and applied to the input of preamplifier 18. The output of this preamplifier is then applied to low-pass filter 19 and high-pass filter 20 to thereby separate the information signal into high and low bands of frequencies. These two different bands of frequencies are then separately amplified in amplifiers 21 and 22. The gain of amplifiers 21 and 22 are respectively controlled in accordance with the outputs of rectifier and filter networks 27 and 24 over conductors 28 and 25. Since these networks will have applied to their input the detected control signals of the corresponding control track, their output control signals will vary in accordance with the compensation necessary to respectively cancel the distortion in each band of frequencies. The outputs of variable gain amplifiers 21 and 22 are thereafter applied to mixing network 30 over conductor 29 to thereby recombine the two bands of frequencies into the original band in which the original information signal was contained. Thus, in accordance with this invention, more accurate compensation can be obtained in broadband applications by dividing the information signal into a plurality of bands and controlling the amplification of each of these bands in response to rectified control signals which respectively lie within the band that they are controlling.

As was pointed out with reference to the illustrated system of FIG. 1, the control signal oscillators may be dispensed with by utilizing a recording medium having prerecorded control signals upon the control signal tracks thereof. While I have shown my record and read heads as being toroidal cores arranged for transverse recording, this invention is not so limited since it is equally applicable to systems utilizing other types of magnetic recording heads as well as systems utilizing perpendicular and longitudinal magnetic recording. The only limitation to this is that when utilizing A.C. control signals, it is recognized that the method of recording and the type of record and read heads used in both tracks should correspond since the control signal will provide the most accurate compensation of the information in the information signal channel when the heads utilized and the system of recording are consistent. This is so since the type head, the frequency of operation, and the manner of recording of the signal information all affect the distortion that might be introduced in the information signal channel due to nonuniformities in the magnetic properties of the tape. Thus, in order to sense these uniformities which are a function of these factors, it is therefore necessary for the most accurate compensation to make such factors common to each channel.

While there has been shown and described the preferred embodiments of the invention, modifications will readily occur to those skilled in the art. For example, the functions of both read head 8 and variable gain amplifier 9 could be performed by a magnetic pickup of the type disclosed in my copending application entitled "Semiconductor Magnetic Pickup," Serial No. 764,974, filed October 2, 1958. By utilizing this type of magnetic pickup, not only could the detection of the recorded signal be performed by the transducer but it could also perform the necessary variable amplification function.

The pickup disclosed in my copending application comprises a core assembly having a front and back gap. The front gap of the core assembly is brought into contact with the moving recording medium while the back gap contains a thin plate of semiconductor material which exhibits the well known "Hall effect" phenomenon. This phenomenon results in a potential difference being established along one axis of the plate of semiconductive material when the element is subjected to the influence of a magnetic field perpendicular to the plane of the plate if the plate is also subjected to a current passed along an axis of the plate perpendicular to the axis along which the patented difference is established.

The gain of this pickup can be varied by applying a control signal to vary the current passed through the plate and thereby control the potential difference or the output signal appearing across the other axis. Thus by applying the detected control signal of detector 6 to the semiconductor to control its bias current, this pickup device performs both functions.

It is further noted that this double function can also be performed by the flux responsive electron beam pickup hereinbefore discussed by controlling the beam intensity to the tube in accordance with the magnitude of the control signal. This can be accomplished by applying the detected control signal of detector 6 to control the grid bias of the pickup tube. In this way, both signal detection and variable amplification are performed by the same device with a corresponding simplification of the system. It is not desired, therefore, that the invention be limited to the arrangement shown and described, and it is intended in the appended claims to cover all such modifications as fall within the true spirit and scope of the invention.

What is claimed is:

1. A magnetic recording playback system which compensates for amplitude distortion due to the lack of uniformity of the magnetic properties of a recording medium upon which constant amplitude control signals have been recorded on one track and information signals on another track thereof comprising means for detecting variations in magnitude of said control signals, means for detecting and amplifying said information signals, and means for controlling the gain of said detecting and amplifying means in response to variations in magnitude of said detected control signals of said one track.

2. A magnetic recording playback system which compensates for amplitude distortion due to the lack of uniformity of the magnetic properties of a recording medium upon which constant amplitude A.C. control signals have been recorded on one track and information signals on another track thereof comprising means for detecting said A.C. control signals on said one track, means for rectifying said detected control signals, means for detecting and amplifying said information signals on said adjacent track, and means for controlling the gain of said detecting and amplifying means in response to variations in amplitude of said rectified signals of said one track.

3. A magnetic recording playback system which compensates for amplitude distortion due to the lack of uniformity of the magnetic properties of a recording medium upon which constant amplitude D.C. control signals have been recorded on one track and information signals on another track thereof comprising means for detecting said D.C. control signals on said one track, means for detecting and amplifying said information signals on said other track, and means for controlling the gain of said detecting and amplifying means in response to variations in amplitude of said detected D.C. signals of said one track.

4. A magnetic recording and playback system which compensates for amplitude distortion due to the lack of uniformity of the magnetic properties of a recording medium upon which constant amplitude control signals have been recorded on one track thereof comprising an information signal source, means for recording signals of said source on a track adjacent said one track, means for detecting variations in magnitude of said control signals on said one track, means for detecting and amplifying said information signals on said adjacent track, and means for controlling the gain of said detecting and amplifying means in response to variations in magnitude of said detected signals of said one track.

5. A magnetic recording and playback system which compensates for amplitude distortion due to the lack of uniformity of the magnetic properties of a recording medium upon which constant amplitude A.C. control signals have been recorded on one track thereof, an information signal source, means for recording signals of said source on a track adjacent said one track, means for detecting variations in magnitude of said recorded A.C. signals on said one track, means for rectifying said detected control signals, means for detecting and amplifying said information signals on said adjacent track, and means for controlling the gain of said detecting and amplifying means in response to variations in magnitude of the output voltage of said rectifying means.

6. A magnetic recording and playback system which compensates for amplitude distortion due to the lack of uniformity of the magnetic properties of a recording medium upon which constant amplitude D.C. control signals have been recorded on one track thereof, an information signal source, means for recording signals of said source on a track adjacent said one track, flux responsive means for detecting variations in magnitude of said D.C. control signals on said one track, means for detecting and amplifying said information signals on said adjacent track, and means for controlling the gain of said detecting and amplifying means in response to variations in magnitude of said D.C. output of said flux responsive detecting means.

7. A magnetic recording and playback system which compensates for magnitude distortion due to the lack of uniformity of the magnetic properties of a recording medium comprising a constant amplitude control signal source, means for recording signals of said control source on said recording medium, an information signal source, means for recording signals of said information signal source on said recording medium, means for detecting variations in magnitude of said recorded control signals, means for detecting and amplifying recorded signals of said information signal source, and means for controlling the gain of said detecting and amplifying means in response to variations in amplitude of said detected control signals.

8. A magnetic recording and playback system which compensates for amplitude distortion due to the lack of uniformity of the magnetic properties of a recording medium comprising a constant amplitude A.C. control signal source, means for recording signals of said control source on said recording medium, an information signal source, means for recording signals of said information signal source on said recording medium, means for detecting said recorded control signals, means for rectifying said detected control signals, means for detecting and amplifying recorded signals of said information signal source, and means for controlling the gain of said detecting and amplifying means in response to amplitude variations of the output voltage of said rectifying means.

9. A magnetic recording and playback system which compensates for amplitude distortion due to the lack of uniformity of the magnetic properties of a recording medium comprising a constant amplitude D.C. control signal source, means for recording said D.C. signals of said source on said recording medium, an information signal source, means for recording signals of said information signal source on said recording medium, flux responsive means for detecting said recorded D.C. control signals, means for detecting and amplifying recorded signals of said information signal source, and means for controlling the gain of said detecting and amplifying means in response to amplitude variations of said D.C. output of said flux responsive detecting means.

10. A magnetic recording and playback system which compensates for the lack of uniformity of the magnetic properties of the recording medium over a wide band of frequencies comprising means for generating control signals of a first and second frequency, means for recording signals of said first and second frequency on said recording medium, an information signal source, means for recording signals of said source on said recording medium, means for detecting said recorded signals of said first and second frequencies, means for detecting recorded signals of said information signal source, means for separating said detected signals of said information source into a first and second band of frequencies, means for amplifying information signals in said first and second bands of frequencies, means for rectifying said detected signals of said first and second frequencies, and means for controlling the gain of said amplifying means in said first and second bands of frequencies respectively in response to said rectified signals of said first and second frequencies.

11. A magnetic recording and playback system which compensates for the lack of uniformity of the magnetic properties of the recording medium over a wide band of frequencies comprising means for generating signals of a first and second frequency, means for recording signals of said first and second frequency on said recording medium, an information signal source, means for recording signals of said source on said recording medium, means for detecting said recorded signals of said first and second frequencies, means for detecting recorded signals of said information signal source, means for separating said detected signals of said information source into a first and second band of frequencies, means for amplifying information signals in said first and second bands of frequencies, means for rectifying said detected signals of said first and second frequencies, means for controlling the gain of said amplifying means in said first and second bands of frequencies respectively in response to said rectified signals of said first and second frequencies, and means for recombining said amplified information signals into a single band of frequencies.

12. A magnetic recording and playback system which compensates for the lack of uniformity of the magnetic properties of the recording medium over a wide band of frequencies comprising means for generating control signals of a first and second frequency, means for recording signals of said first and second frequency on a given area of said recording medium, an information signal source, means for recording information signals of said source on an area of said recording medium other than said given area, means for detecting said recorded signals of said first and second frequencies, means for detecting recorded signals of said information signal source, first and second band-pass filters for separating said detected signals of said information source into a first and second band of frequencies, first means for amplifying information signals in said first band of frequencies, second means for amplifying information signals in said second band of frequencies, means for rectifying said detected signals of said first and second frequencies, and means for controlling the gain of said first and second amplifying means respectively in response to said rectified signals of said first and second frequencies.

13. A magnetic recording and playback system which compensates for the lack of uniformity of the magnetic properties of the recording medium over a wide band of frequencies comprising first means for generating control signals of a given frequency, second means for generating control signals of the frequency different than said given frequency, means for recording control signals of said first frequency on a first track of said recording medium, means for recording control signals of second frequency on a second track of said recording medium, an information signal source, means for recording information signals of said source on a third track of said recording medium, first means for detecting control signals recorded on said first track, second means for detecting control signals recorded on said second track, means for detecting information signals recorded on said third track, means for separating said detected information signals into a first and second band of frequencies, means for amplifying information signals in said first band of frequencies, means for amplifying information signals in said second band of frequencies, means for rectifying said control signals detected in said first track, means for rectifying said control signals detected in said second track, means for controlling the gain of said first band of frequencies amplifying means in response to output voltage variations of said first track rectifying means, and means for controlling the gain of said second band of frequencies amplifying means in response to output voltage variations of said second track rectifying means.

14. A magnetic recording and playback system which compensates for the lack of uniformity of the magnetic properties of the recording medium over a wide band of frequencies comprising first means for generating control signals of a given frequency, second means for generating control signals of the frequency different than said given frequency, means for recording control signals of said first frequency on a first track of said recording medium, means for recording control signals of a second frequency on a second track of said recording medium, an information signal source, means for recording information signals of said source on a third track of said recording medium, first means for detecting control signals recorded on said first track, second means for detecting control signals recorded on said second track, means for detecting information signals recorded on said third track, means for separating said detected information signals into a first and second band of frequencies, means for amplifying information signals in said first band of frequencies, means for amplifying information signals in said second band of frequencies, means for rectifying said control signals detected in said first track, means for rectifying said control signals detected in said second track, means for controlling the gain of said first band of frequencies amplifying means in response to output voltage variations of said first track rectifying means, means for controlling the gain of said second band of frequencies amplifying means in response to output voltage variations of said second track rectifying means, and means for recombining said amplified information signals in said first and second band of frequencies into a single band of frequencies.

References Cited in the file of this patent

UNITED STATES PATENTS

| | | |
|---|---|---|
| 2,499,603 | Mueller | Mar. 7, 1950 |
| 2,791,640 | Wolfe | May 7, 1957 |
| 2,807,797 | Shoemaker | Sept. 24, 1957 |